April 15, 1947.   C. P. R. DE VILLIERS   2,419,059
APPARATUS FOR THE HYDRAULIC TRANSMISSION OF POWER
Filed July 12, 1941   3 Sheets-Sheet 1
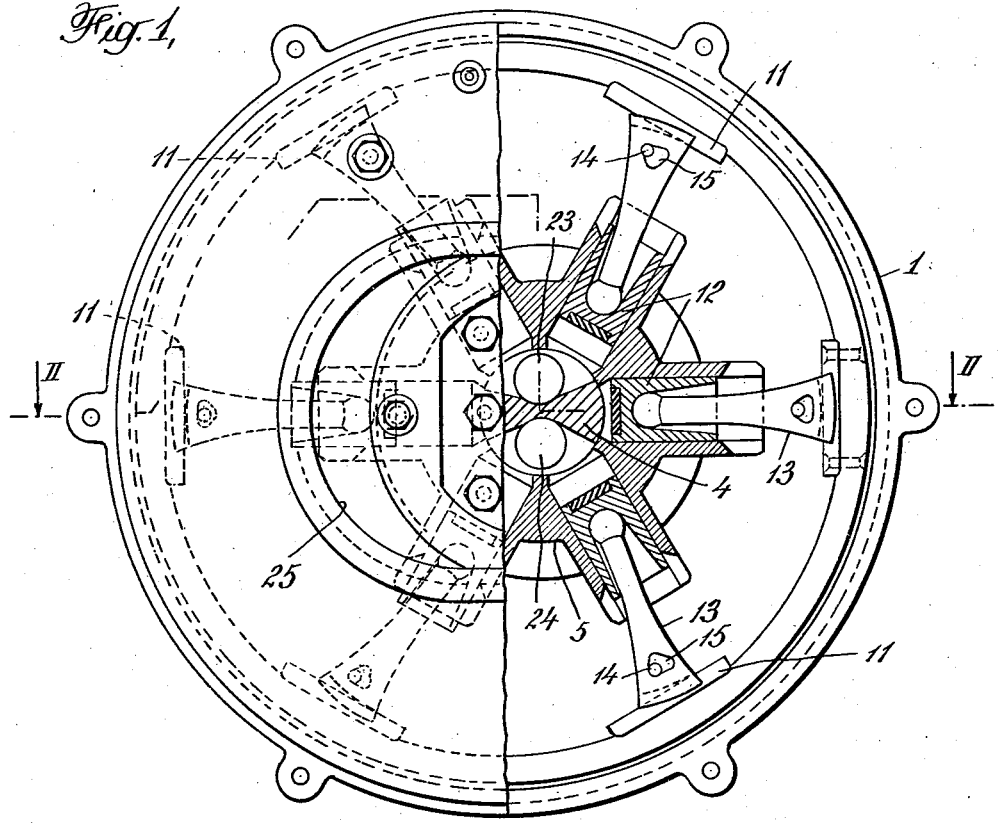
Fig. 1,
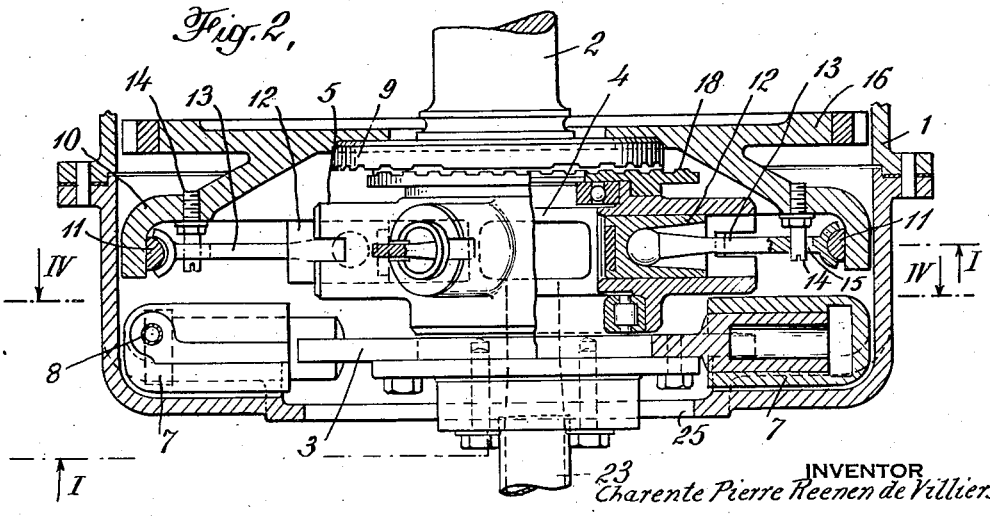
Fig. 2,
INVENTOR
Charente Pierre Heenen de Villiers
BY Pennie, Davis, Marvin & Edmonds
ATTORNEYS

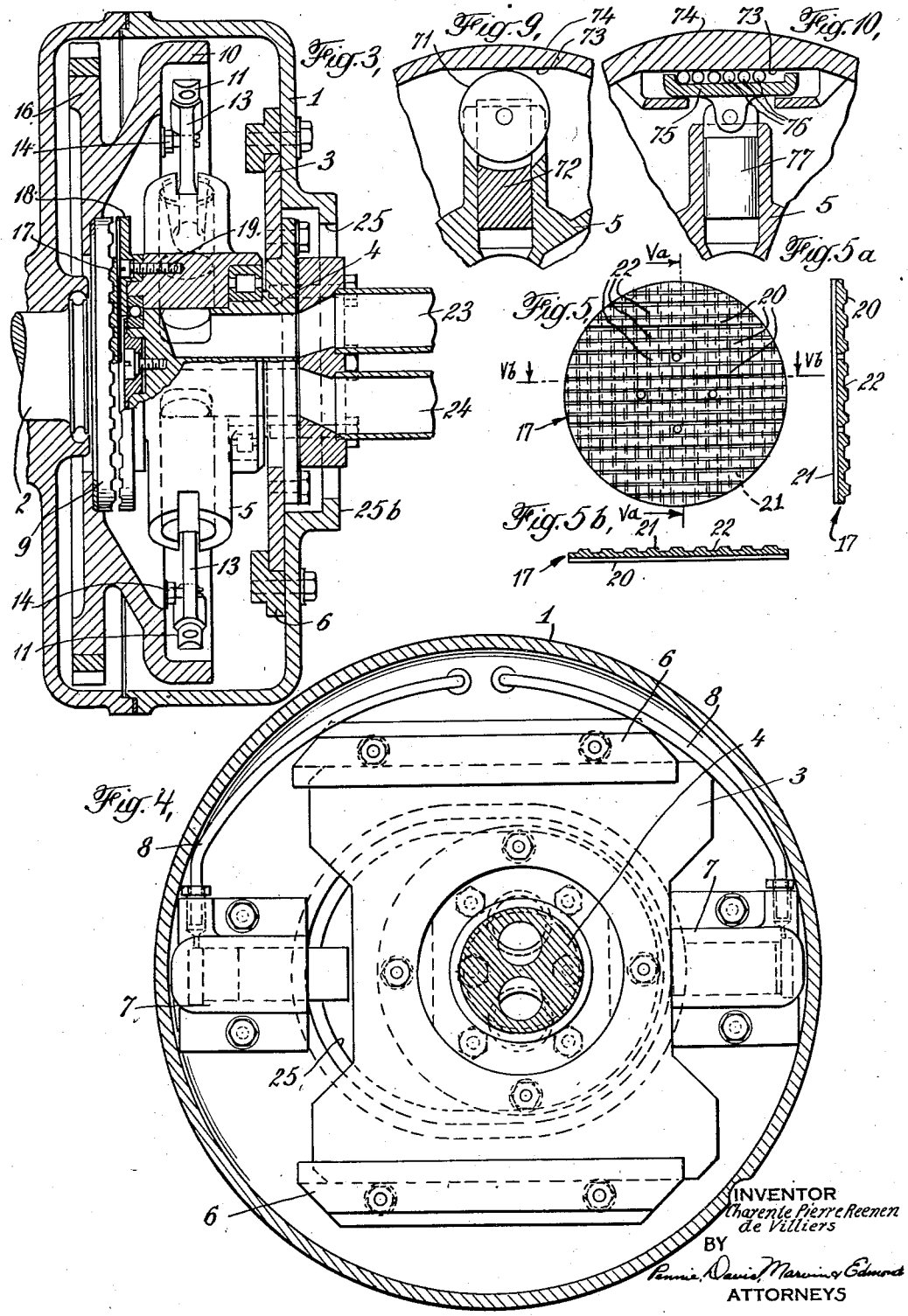

April 15, 1947.                C. P. R. DE VILLIERS                2,419,059
APPARATUS FOR THE HYDRAULIC TRANSMISSION OF POWER
Filed July 12, 1941                        3 Sheets-Sheet 3
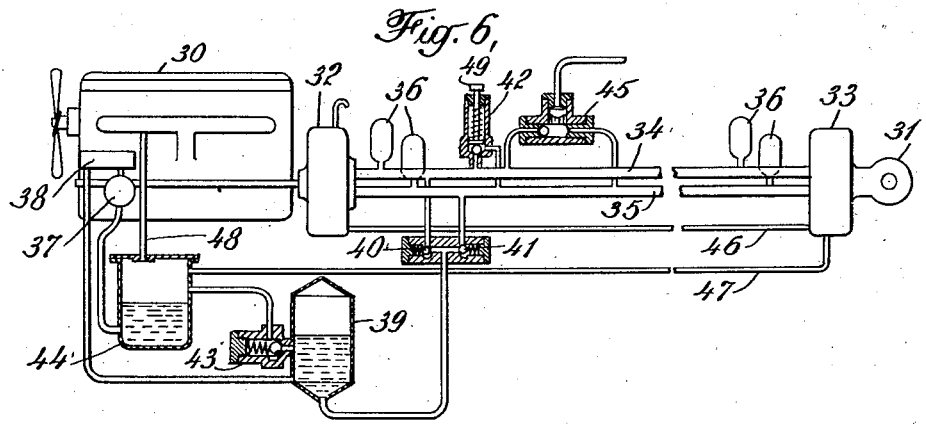
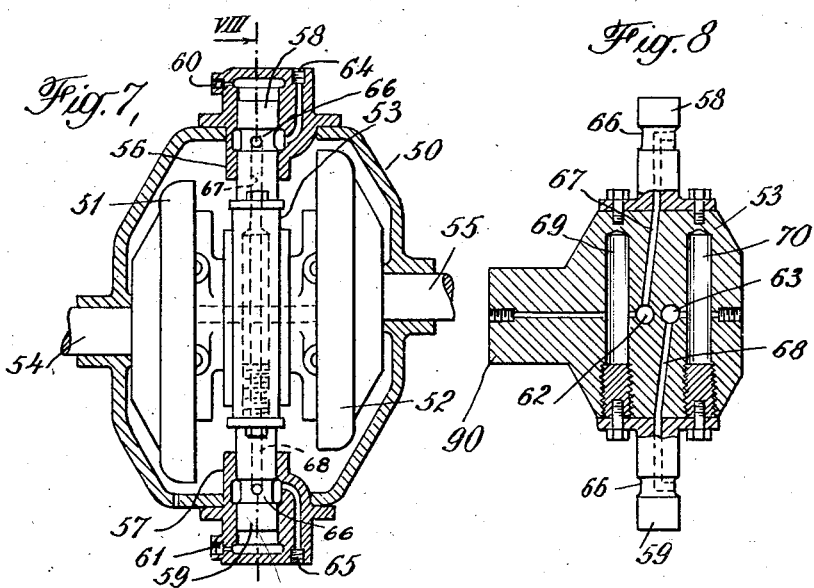
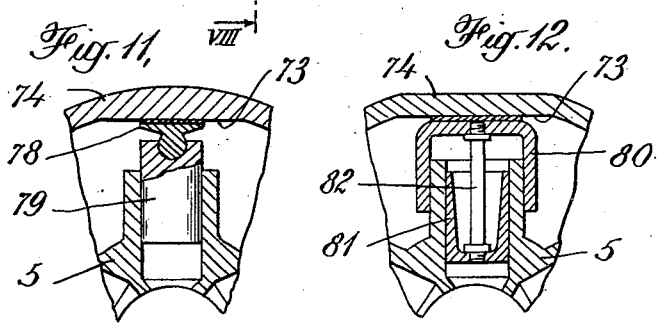
INVENTOR
Charente Pierre Reenen de Villiers
BY
Pennie, Davis, Marvin & Edmonds
ATTORNEYS Patented Apr. 15, 1947

2,419,059

UNITED STATES PATENT OFFICE 2,419,059

APPARATUS FOR THE HYDRAULIC TRANSMISSION OF POWER

Charente Pierre Reenen de Villiers, Tokai, Cape Town, Cape Province, Union of South Africa
Application July 12, 1941, Serial No. 402,146
In Great Britain July 16, 1940

13 Claims. (Cl. 103—161)

1

This invention relates to improvements in apparatus used for the hydraulic transmission of power and refers more particularly to pumps and motors of the radially disposed cylinder type employed for power transmission purposes in motor vehicles and the like.

The invention concerns that type of pump or motor in which a plurality of radially disposed pump cylinders are caused to rotate about a cylindrical or conical valve ported shaft. More particularly the invention concerns a pump or motor in which the pistons operate in radially disposed cylinders formed integrally with a cylinder block which rotates about the cylindrical or conical valve-ported shaft. The piston rods of each piston are so constructed and arranged that they have a rolling bearing contact with an annular member which surrounds the cylinder block and has its bearing surface eccentric thereto. The cylinder block is connected to a power-transmitting shaft through a pair of flanges, one connected to the shaft and the other to the cylinder block, which are provided with ribs and grooves on their adjacent faces, and a coupling member interposed between the grooved faces of the flanges which has its opposite faces formed with grooves and ribs which cooperate with the grooves and ribs of the adjacent faces of the flanges. The invention also includes other features of construction of the pump or motor as will appear from the detailed description to follow.

To enable the invention to be more clearly understood and carried into practice, reference is now made to the accompanying drawings in which like references denote like parts throughout the several views.

In the drawings which illustrate preferred constructions according to the invention:

Fig. 1 is a part-sectional end elevation taken on line I—I of Fig. 2.

Fig. 2 is a part-sectional plan taken on line II—II of Fig. 1.

Fig. 3 is a part-sectional elevation of the pump or motor shown in Fig. 1.

Fig. 4 is an end sectional elevation taken on line IV—IV of Fig. 2.

Figs. 5, 5a and 5b are elevation, vertical section and sectional plan respectively of the coupling member.

Fig. 6 is a diagrammatic view of the application of the invention to a motor vehicle.

Fig. 7 is a part-sectional elevation of a modification of the arrangement of Fig. 6.

2

Fig. 8 is a vertical part-sectional elevation taken on line VIII—VIII of Fig. 7.

Figs. 9 to 12 are fragmentary views showing modifications of the association of the plungers with the outer annular member.

Referring to the drawings, reference numeral 1 denotes the outer casing split circumferentially into two parts one of which supports a bearing for the driving or driven shaft 2, while the other part provides supporting means for a slide plate 3 carrying the short valve-ported shaft 4 on which a six-bored cylinder block 5 is rotatably journalled. The slide plate 3 is slidably mounted by means of the guides 6, and its sliding movement is effected by means of the opposing hydraulic control cylinders 7 which are connected by pipes 8 to automatic or hand- or foot-operated servo-motor control means (not shown).

Connected to a flange 9 of the shaft 2, is the outer annular member 10 of dished shape which is provided with a bearing surface 11 radially opposite each cylinder as clearly shown in Fig. 1. Each cylinder has a plunger 12 connected to a plunger rod 13 by a ball joint in known manner. The outer end of each rod 13 is however of arcuate shape and is adapted to make rolling contact with its bearing surface 11 which is formed in the shape of a half-round rib adapted to fit in the shape of a correspondingly shaped groove on the end of said rod 13, as clearly shown in Fig. 2. The arcuate end of each rod 13 is located by a locating pin 14 extending through a suitably shaped clearance hole 15 therein. The annular member 10 is provided with a gear ring 16 for starting purposes, when the device is coupled to an internal-combustion engine.

The cylinder block 5 is coupled to the shaft 2 by way of a circular coupling member 17 which is interposed between the flange 9 and a flange 18 secured to the cylinder block 5 by studs 19 (see Fig. 3). This member, 17 is shown in Figs. 5, 5a and 5b, is in the form of a disc having a series of parallel ribs 20 on one side and a similar series of ribs 21 on the opposite side which latter are disposed at right angles to the ribs 20. Similar series of ribs are provided on the flanges 9 and 18. The valleys 22 between the ribs 20, 21 in each case are of the same shape and size as the said ribs, so that in the co-acting position shown in Figs. 2 and 3, the ribs on one face engage slidably in the valleys on the opposing face. In the example shown the ribs and valleys generally are of V-shape to conform to the contour of the standard screw thread and preferably are of a section known as the "Acme thread" form.

Inlet and outlet passages for the admission and discharge of the working fluid are shown at 23 and 24. These passages communicate with corresponding admission and discharge ports in the valve-ported shaft 4, which ports communicate in turn with the cylinders in known manner. As shown these passages in the form of conduits, extend through an oval opening 25 in one side of the casing 1. To prevent leakage of oil from the casing at this point any suitable flexible or sliding covering may be provided against face 25b.

Fig. 6 illustrates diagrammatically the application of the invention to a motor vehicle for the purpose of providing a variable gear ratio between an engine 30 and a differential gear 31 driving the road wheels. One unit 32 constructed according to the invention and acting as a pump, is mechanically coupled to the engine, 30, while a second similar unit 33 acting as a motor is similarly coupled to the differential gear 31. The inlet and outlet passages of both units are connected by the pipes 34 and 35 so as to form a closed circuit for the working fluid which is oil.

To reduce any possible vibration which may be caused by the pulsations, gas-filled expansion chambers 36 are connected to the pipes 34 and 35, two adjacent the pump unit 32 and two adjacent the motor unit 33. The chambers 36 are preferably filled with an inert gas such as nitrogen.

In order to keep the pump and motor unit cylinders completely filled with oil when in use, an engine-driven scavenging pump 37 is arranged to deliver oil at a moderate pressure through a filter 38 to an air-loaded make-up tank 39, whence the oil may flow as required past either of the non-return valves 40 and 41 to either of the pipes 34, 35, i. e. to whichever pipe has a lower pressure than the tank 39.

A spring-loaded safety valve 42 may be provided to limit the maximum pressure of the oil in the circuit to a safe value, and thereby to avoid undue strain on the rear axle and consequent slipping of the road wheels.

A spring-loaded release valve 43 allows oil to escape to a reservoir tank 44 when the pressure in the tank 39 rises above a predetermined value. The valve 45 supplies oil under pressure to control apparatus of the servo-motor type (not shown).

Since in the case of both pump and motor units, leakage of oil into their casings takes place to a certain extent, it is necessary to drain this oil off continuously by means of pipes 46 and 47, which oil is returned to the reservoir tank 44 for reuse. The air space in the tank 44 is connected by a pipe of small bore 48 to the induction manifold of the engine so as to remove surplus air which might cause an air lock.

In certain circumstances it may be desirable to allow the road wheels or engine to rotate independently. This is conveniently achieved simply by releasing the spring pressure on the safety valve 42 by the rod 49, whereby the pipes 34 and 35 are short-circuited.

For most automobiles it is preferable to regulate the eccentricity of cylinder block of the motor 33 automatically so that at full throttle the engine develops full power, while at part throttle opening, it runs at a speed corresponding to maximum economy of fuel. The eccentricity of the cylinder block of the pump unit 32 may be regulated manually with the aid of a servo-motor. The manual control lever may have positions or notches corresponding to "forward," "reverse," "neutral," and "extra low gear." The servo-motors referred to may be of the hydraulic cylinder type or they may be electrically operated such as by means of an electric motor arranged to alter the eccentricity through screw or worm gearing.

To provide for the relative movement of the ends of the pipes 34 and 35, they may be bent to increase their flexibility, or flexible or sliding connections may be interposed where found necessary.

Figs. 7 and 8 show a modified arrangement in which both units are enclosed in a single casing 50 so as to provide a self-contained variable speed gear for both forward and reverse motion. As shown a pump unit 51 and a motor unit 52 are connected in back to back relationship to a common dividing member 53, arranged for sliding movement at right angles to the axes of the driving and driven shafts 54 and 55 respectively, by means of the hydraulic control cylinders 56 and 57, and plungers 58 and 59. The said cylinders are connected to a servo-motor (not shown) by way of their connections 60 and 61.

In this case the two units are connected so that the delivery passages 23 and 24 (see Fig. 1) coincide with corresponding passages 62 and 63 in the member 53 so that a closed circuit for the working fluid is provided. To enable make-up fluid to be introduced continuously as required, connections 64 and 65 communicate with an annular recess 66 in the plungers 58 and 59, which recesses communicate by ducts 67, 68 with the passages 62 and 63. The connections 64 and 65 are connected by piping to a make-up tank such as that shown by reference 39 in Fig. 6, through non-return valves as described with reference to this figure. A safety valve such as 42 is preferably also connected in this circuit. The gas expansion chambers in this case are formed by the cavities 69 and 70 in the member 53.

To prevent movement about the axis of the plunger 58, a projection 90 on the member 53 is adapted to be slidably located by guiding means (not shown) on the inside of the casing 50.

It is to be understood from the foregoing description that sliding movement of the dividing member carrying both valve ported shafts, controls the degree of eccentricity of both pump and motor cylinder blocks with respect to the driving and driven shafts respectively. It therefore follows that movement of the dividing member simultaneously controls and varies the output and input capacities of both pump and motor so that a variable speed gear is provided, the ratio of which is dependent upon the degree of eccentricity between the axes of the valve ported shafts and the axes of the driving and driven shafts. Movement of the dividing member in one direction will provide variable gear ratios for forward drive, while movement in the reverse direction past the position where these axes coincide, will provide a similar range of ratios for reverse drive.

Figs. 9 to 12 show modifications in the method of transmitting reciprocatory motion to the plungers of the cylinder block 5.

In Fig. 9 a wheel or roller 71 is mounted in the slotted end of a plunger 72. The wheel 71 makes rolling contact with the bearing surface 73 on the inside of the annular member 74.

In Fig. 10 contact with the bearing surface 73 is made by means of a shallow cup-shaped housing 75 containing a plurality of balls or rollers 76. The said housing is pivotally attached to the end of a plunger 77.

In Fig. 11 contact with the bearing surface 73 is made by means of an anti-friction pad 78 which is spherically seated in top end of a plunger 79.

In Fig. 12 an anti-friction pad 80 constructed in the form of a sleeve or cup, is slidably mounted on the outside of each cylinder and is connected to a plunger 81 by a connecting rod 82.

What I claim is:

1. An apparatus comprising a plurality of radially disposed cylinders in a block rotatable about a valve-ported shaft, plungers in the cylinders, an outer annular member having a bearing surface for each plunger so arranged as to control the movement of the plungers, said annular member being connected to a power-transmitting shaft, slide means connected to the valve-ported shaft to slide said shaft at right angles to the power-transmitting shaft to give eccentric adjustment to the cylinders with respect to said outer annular member to vary the strokes of the plungers, a self-adjusting coupling having a coupling flange connected to the cylinder block with at least one rib or one groove on its face, another coupling flange connected to the power-transmitting shaft having at least one rib or one groove on its face, and a coupling member interposed between said flanges having at least one rib or one groove on one face in engagement with a corresponding rib or groove on one flange and at least one rib or groove on its opposite face in engagement with a corresponding rib or groove on the other flange, said ribs or grooves on the opposite faces of the coupling member being disposed at right angles to each other whereby the coupling member is in slidable engagement with the flanges.

2. An improved apparatus as claimed in claim 1, wherein each plunger is pivotally connected to a plunger rod having an outer arcuate-shaped end arranged for rolling contact with a coacting bearing surface provided on the inside of the outer annular member radially opposite each cylinder, and wherein a shallow cup-shaped housing is pivotally attached to each plunger and contains a plurality of rolling means forming the contacting means between the plunger and the bearing surface therefor.

3. An improved apparatus as claimed in claim 1 wherein anti-friction pads spherically seated in the outer ends of the plungers are adapted to make sliding contact with the respective bearing surfaces on the outer annular member.

4. The apparatus claimed in claim 1 in which each plunger is pivotally connected to a plunger rod having an outer arcuate-shaped end arranged for rolling contact with a straight co-acting bearing surface on the outer annular member radially opposite the cylinder in which the plunger operates.

5. The apparatus claimed in claim 1 in which each plunger is pivotally connected to a plunger rod having an arcuate-shaped end arranged to co-act in rolling contact with a guide extending along the inside of the annular member opposite the cylinder in which the plunger operates, and wherein a locating pin fixed to the annular member and extending through a clearance hole in each plunger rod retains the arcuate-shaped end of such plunger in position adjacent said bearing surface.

6. The apparatus claimed in claim 1 in which each plunger is pivotally connected to a plunger rod having an outer arcuate-shaped end arranged for rolling contact with a straight bearing surface provided on the inside of the outer annular member opposite the cylinder in which the plunger operates, and in which the center of the radius of curvature of the arcuate-shaped end of the plunger rod is the pivotal axis of the plunger rod with respect to the plunger.

7. The apparatus claimed in claim 1 in which each plunger is pivotally connected to a plunger rod having an outer arcuate-shaped end arranged for rolling contact with a co-acting straight bearing surface provided on the inside of the outer annular member radially opposite the cylinder in which the plunger operates, and in which the center of the radius of curvature of the arcuate-shaped end of each plunger is located between the mid-point of the plunger rod and the pivot axis of the plunger rod with respect to the plunger.

8. An apparatus comprising a power-transmitting shaft, a rotatable annulus operatively connected to said power-transmitting shaft, a rotatable cylinder block having a series of radially exending cylinders, plungers in said cylinders, said annulus eccentrically surrounding the rotatable cylinder block and the cylinders carried thereby and having adjacent each cylinder and the plunger therein a straight surface which is perpendicular to the axis of the cylinder when viewed in the direction of the axis of the cylinder block, and members between the plungers and their adjacent surfaces, each plunger being pivoted to one of said members to allow relative angular movement between the member and the plunger in the plane of rotation of said block, the end of said member nearest the annulus being arranged to coact in rolling contact with the adjacent straight surface.

9. The apparatus claimed in claim 8, in which the plungers are connected to the members by ball joints allowing free angular movement in all directions between each plunger and the member jointed thereto.

10. An apparatus comprising a rotatable cylinder block with a plurality of radially disposed cylinders, pistons for the cylinders, an annular bearing member surrounding the cylinder block and having its bearing surface eccentric thereto, a power-transmission shaft coaxial with and rigidly connected to said annular bearing member, means for effecting rolling bearing contact between the bearing member and the pistons, a self-adjusting coupling connecting the cylinder block to the shaft, said coupling comprising a flange connected to the shaft having a plurality of ribs and grooves on one face, a flange connected to the cylinder block having a plurality of ribs and grooves on one face, a coupling member interposed between the faces of the flanges, the coupling member having on one face a plurality of ribs and grooves which are at right angles to a plurality of ribs and grooves on its opposite face, the said ribs and grooves of the flanges and the coupling member being diametrical and forming a sliding engagement between the flanges and the coupling member.

11. An apparatus comprising a rotatable annulus, a rotatable cylinder block having a series of radially-extending cylinders, plungers in said radial cylinders, said annulus being provided adjacent each cylinder with a straight surface which is perpendicular to the axis of the respective adjacent cylinder when viewed in the direction of the axis of the said block, members between said plungers and said straight surfaces, each plunger being pivoted to one such member to enable relative angular movement between the member and the plunger in the plane of rotation of the cylinder block, the end of said member nearest the annulus being arranged to coact in rolling motion with the straight surface adjacent the plunger to which it is pivoted.

12. An apparatus comprising a rotatable cylinder block having radial cylinders, a rotatable annular member surrounding said block, a power-transmitting shaft co-axial with and rigidly connected to said annular member, an Oldham type coupling connecting said shaft to said block for rotating said block at the same angular speed as said annular member, said coupling transmitting substantially only the torque necessary for rotating said cylinder block, means for moving said block to positions in which the block axis is parallel with but spaced from the axis of said annular member, plungers in said cylinders, a straight surface on the inside of said annular member adjacent each cylinder, said surface being perpendicular to the axis of its adjacent cylinder, and a connecting member between each such surface and the plunger in the cylinder adjacent the surface, said connecting member being arranged to roll on said surface and being connected by a ball joint to said plunger.

13. An apparatus comprising a power-transmitting shaft, a cylinder block having radial cylinders, a rotatable annulus fixed to said shaft and surrounding said cylinder block, plungers in said cylinders, a valve-ported shaft eccentric with respect to said annulus, said cylinder block being mounted for rotation upon said valve-ported shaft, a self-adjustable coupling connecting said cylinder block to said annulus, said annulus having adjacent each cylinder a straight ridge of substantially U-shape in cross section, and a rod co-acting with each such ridge, each rod having one end of arcuate shape arranged for rolling contact with its respective ridge, a ball joint connecting the other end of each rod to the plunger in the cylinder adjacent the ridge, the center of curvature of said arcuate shape being substantially at the center of said ball joint, each rod having a hole and a pin passing through said hole and being fixed to said annulus for positioning the rod having the hole through which the pin passes.

CHARENTE PIERRE
REENEN DE VILLIERS.

REFERENCES CITED

The following references are of record in the file of this patent:

UNITED STATES PATENTS

| Number | Name | Date |
|---|---|---|
| 1,592,864 | Magie et al. | July 20, 1926 |
| 1,904,496 | Maw | Apr. 18, 1933 |
| 2,186,556 | Robbins | Jan. 9, 1940 |
| 2,211,402 | Benedek | Aug. 13, 1940 |
| 1,965,937 | Ferris | July 10, 1934 |
| 958,212 | Baab | May 17, 1910 |
| 1,269,338 | Tourreil | June 11, 1918 |
| 932,033 | Krone | Aug. 24, 1909 |
| 1,044,846 | Barbarou | Nov. 19, 1912 |
| 1,152,729 | Hele-Shaw | Sept. 7, 1915 |
| 1,320,485 | Maw et al. | Nov. 4, 1919 |
| 1,852,335 | Rosen | Apr. 5, 1932 |
| 1,502,310 | Magie et al. | July 22, 1924 |
| 1,924,124 | Kuzelewski | Aug. 29, 1933 |
| 2,163,570 | Benedek | June 27, 1939 |
| 2,164,171 | Benedek | June 27, 1939 |
| 1,960,547 | Paulson | May 29, 1934 |
| 2,081,028 | Winther | May 18, 1937 |
| 2,148,170 | Mixer | Feb. 21, 1939 |
| 335,199 | Hoxsie | Feb. 2, 1886 |
| 1,182,905 | Hamilton et al. | May 16, 1916 |
| 2,011,147 | Haskelau | Aug. 13, 1935 |
| 2,293,692 | Wylie | Aug. 18, 1942 |
| 1,917,783 | Vickers | July 11, 1933 |
| 1,930,163 | Ferris | Oct. 10, 1933 |
| 2,025,758 | Long | Dec. 31, 1935 |
| 2,054,110 | Worth | Sept. 15, 1936 |

FOREIGN PATENTS

| Number | Country | Date |
|---|---|---|
| 226,901 | German | Oct. 11, 1910 |